United States Patent [19]
Heller

[11] Patent Number: 5,874,894
[45] Date of Patent: Feb. 23, 1999

[54] VEHICLE SYMBOL ILLUMINATION APPARATUS

[76] Inventor: Peter E. Heller, P.O. Box 553, Purchase, N.Y. 10577

[21] Appl. No.: 781,956

[22] Filed: Dec. 20, 1996

Related U.S. Application Data

[63] Continuation-in-part of Ser. No. 502,709, Jul. 14, 1995, abandoned.

[51] Int. Cl.[6] ................................................. B60Q 1/44
[52] U.S. Cl. .......................... 340/479; 340/467; 362/83.3
[58] Field of Search ..................... 340/479, 467, 340/463, 468, 469, 425.5; 362/83.3

[56] References Cited

U.S. PATENT DOCUMENTS

| | | |
|---|---|---|
| D. 82,880 | 12/1930 | Fisher . |
| D. 83,168 | 1/1931 | Muldoon . |
| D. 156,798 | 1/1950 | Wright . |
| D. 232,869 | 9/1974 | Yoshimura ............ D3/1 |
| D. 289,146 | 4/1987 | Freshwater . |
| D. 313,661 | 1/1991 | Kang ............ D26/31 |
| D. 317,054 | 5/1991 | Olmstead ............ D26/32 |
| D. 336,145 | 6/1993 | Reifslager ............ D26/29 |
| 1,390,561 | 9/1921 | Kelly . |
| 1,777,719 | 10/1930 | Duffus ............ 362/812 |
| 1,784,884 | 12/1930 | Smith . |
| 2,485,719 | 10/1949 | Edwards ............ 200/59 |
| 2,800,545 | 7/1957 | Pellegrino ............ 200/61.89 |
| 2,836,913 | 6/1958 | Thomson et al. ............ 40/129 |
| 4,297,675 | 10/1981 | Rubottom et al. . |
| 4,494,326 | 1/1985 | Kanamori ............ 40/593 |
| 4,574,269 | 3/1986 | Miller . |
| 4,631,516 | 12/1986 | Clinker . |
| 4,745,525 | 5/1988 | Sheehy ............ 362/32 |
| 4,763,234 | 8/1988 | Scott ............ 340/485 |
| 4,806,903 | 2/1989 | Rust . |
| 4,843,369 | 6/1989 | Jimenez et al. ............ 340/479 |
| 4,857,890 | 8/1989 | Solow ............ 340/479 |
| 4,860,476 | 8/1989 | Hall ............ 410/593 |
| 4,868,542 | 9/1989 | Thompson ............ 340/479 |
| 4,868,719 | 9/1989 | Kouchi et al. ............ 340/479 |
| 4,879,826 | 11/1989 | Wittke ............ 40/551 |
| 4,916,584 | 4/1990 | Gustafson ............ 362/61 |
| 4,928,084 | 5/1990 | Reiser ............ 340/479 |
| 4,935,722 | 6/1990 | Pollack ............ 340/479 |

FOREIGN PATENT DOCUMENTS

| | | |
|---|---|---|
| 5229460 | 9/1993 | Japan . |
| 2232288 | 12/1990 | United Kingdom ............ 340/479 |

*Primary Examiner*—Brent A. Swarthout
*Attorney, Agent, or Firm*—Hedman, Gibson & Costigan, P.C.

[57] ABSTRACT

A vehicle symbol illumination apparatus is provided which is operable in conjunction with a high mounted brake light wherein the illumination for the vehicle symbol is extinguished, masked or brightened when the high mounted brake light is activated.

2 Claims, 5 Drawing Sheets

VEHICLE SYMBOL ILLUMINATION APPARATUS

This application is a continuation-in-part of U.S. patent application, Ser. No. 08/502,709 filed on Jul. 14, 1995, now abandoned.

BACKGROUND OF THE INVENTION

The present invention relates to vehicle signal lights. More specifically, the present invention relates to brake lights for a vehicle and in particular to the high mount stop lamp mandated by the National Highway Transit Safety Administration (NHTSA) in 1986 in conjunction with the illumination of an automobile manufacturer's or vehicle model's logo.

Manufacturers expend substantial sums each year to insure brand and product recognition. In particular, in the automobile industry, much effort is put into insuring recognition of particular symbols associated with vehicles, e.g., the Mercedes-Benz thri-star, the Cadillac wreath, the Honda "H", and the Audi circles, etc. To this end, manufacturers usually attach their particular logos or symbols to their vehicles in appropriate locations. Some manufacturers have also attached vehicle symbols to the brake lights such as the Ford Thunderbird.

In 1986, legislation was enacted requiring that automobiles have a third brake light disposed toward the upper middle section of the rear of the automobile. It was determined through various studies that the inclusion of a third brake light would reduce the number of rear-end collisions. The requirements for this "high mounted stop lamp" are set forth in Federal Motor Vehicle Safety Standard No. 108 by the National Highway Traffic Safety Administration (NHTSA).

The rear high mounted stop light is generally located above and between the traditional rear stop lights. In most cases manufacturers have placed the high mount stop light inside the rear window of the vehicle, although today it often appears as an array in air dams. The size and shape of the mandated high mount brake light varies but the most common are rectangular in shape, approximately 4 to 5 inches in length and approximately 2 inches in height.

Japanese Patent Application, 52 29460 is representative of the mandated high mounted brake light located in the rear air dam of a vehicle.

In the prior art is U.S. Pat. No. 4,745,525 to Sheehy which describes a fiber-optic lighting system for display of a vehicle manufacturer's name in the tailgate of a pickup truck. This system is very large and complex and is not readily adaptable to passenger automobiles. Additionally, Sheehy displays the manufacturer's full name (six letters) across a substantial area of the vehicle. Illumination of Sheehy's large letters could be disconcerting and thus hazardous and counter productive to the reduction of rear end collisions. In addition, it would be unattractive, costly, and space consuming for a passenger vehicle.

U.S. Pat. Nos. 2,836,913, 4,860,476, 4,843,369, 4,879,826, 2,800,545, 2,485,719, exemplify the fact that it is well known in the art that illuminated messages can be displayed by an apparatus attached to the rear end of a vehicle.

Although messages and illuminated manufacturers logos have been proposed for vehicles, neither of these two items have ever been incorporated or even suggested to be incorporated with the mandated high mounted brake light. More importantly, the prior art has never disclosed or suggested incorporating an illuminated manufacturer's logo with the mandated high mounted brake light. Such a functional assembly would result in cost savings to automobile manufacturers because two separate elements, the illuminated logo and mandated high mounted brake light would be incorporated in one element. In addition the inclusion of an illuminated logo or visible product recognition device would save the vehicle manufacturer substantial advertising expenditures.

Thus, there is a need in the art for an apparatus to illuminate and display a manufacturer's logo or vehicle recognition symbol in a manner to be readily observed by the public.

SUMMARY OF THE INVENTION

With the foregoing in mind, it is an object of the invention to provide an apparatus to illuminate a manufacturer's logo or vehicle recognition device.

It is a further object of the present invention to incorporate the illuminated manufacturer's logo or vehicle recognition device with the mandated high mounted brake light.

In accordance with the invention, a vehicle symbol illumination apparatus is provided which is operable in conjunction with a vehicle braking system. The vehicle symbol illumination apparatus includes a plurality of brake lights, a symbol display disposed above and between the brake lights on a vehicle, a power source, a switch responsive to operation of the vehicle braking system for electrically connecting the power source to the symbol display and to the plurality of brake lights. The symbol display upon electrical connection to the power source illuminates an appropriate symbol associated with the vehicle.

In a preferred embodiment the symbol or logo is illuminated when the parking or driving lights of the vehicle are turned on and the symbol or logo illumination gets brighter when the brake is depressed, thereby allowing the illuminated symbol or logo to act as the third high mounted brake light.

In a more preferred embodiment the present invention combines a mandated high mounted brake light which preferably is mounted above and between, preferably equidistant between, the standard brake lights on the right and left rear end of a vehicle and a manufacturers logo or vehicle recognition symbol, a power source, and a switch responsive to the vehicles braking system for electrically connecting the power source to both the logo or symbol and the mandated high mounted brake light. Upon activation of the parking or driving lights, the logo or symbol is illuminated. Upon depression of the brake, the illumination of the logo is extinguished or masked and the high mounted brake light is illuminated. When the brake is released, the high mounted brake light is extinguished and the log or symbol is again illuminated.

In a further preferred embodiment of the present invention the mandated high mounted brake light is a separate and distinct light structure from an illuminated manufacturers logo or vehicle recognition symbol located on the rear of the vehicle. However, the mandated high mounted brake light and the illuminated logo are connected to a power source and a switch responsive to the vehicles braking system for electrically connecting the power source to both the logo or symbol and the mandated high mounted brake light. Upon activation of the parking or driving lights, the logo or symbol is illuminated and when the brake is depressed, the illumination of the logo is extinguished or masked and the high mounted brake light is illuminated. When the brake is released, the high mounted brake light is extinguished and the logo or symbol is again illuminated.

BRIEF DESCRIPTION OF THE DRAWINGS

The accompanying drawings, referred to herein and constituting a part hereof, illustrate preferred embodiments of the invention and, together with the description, serve to explain the principles of the invention, wherein.

DETAILED DESCRIPTION OF THE DRAWINGS

As described hereinafter, the vehicle symbol or logo illumination apparatus according to the invention is applied to a passenger automobile. It will be appreciated that the vehicle symbol illumination apparatus is equally applicable to other types of vehicles including trucks and sport utility vehicles.

Figure 1:
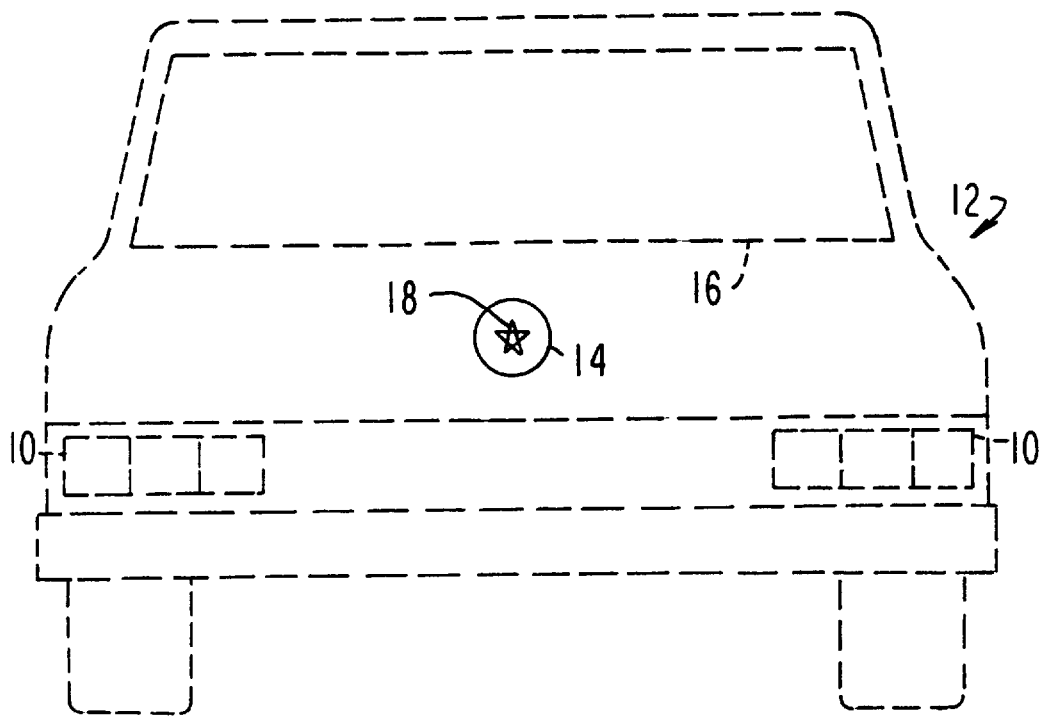
FIG. 1 illustrates an embodiment of the vehicle symbol illumination apparatus in accordance with the invention located on the rear portion of an automobile.

FIG. 1 shows the rear portion of an automobile illustrating the location of the vehicle symbol illumination apparatus in accordance with the instant invention. As shown in the figure, conventional rear brake lights 10 are disposed on each side of the rear portion of automobile 12. In addition, vehicle symbol illumination apparatus 14 is disposed above and between the conventional brake lights on the rear portion of the automobile but below rear window 16. As show in the figure, the symbol 18 to be illuminated in red is in the shape of a star and is combined with the mandated high mounted brake light. Of course any other desired shape may be used, but the total illuminated area of the symbol should be not less than 4.5 square inches. In particular, it may be desired to illuminate an automobile manufacturer's symbol, logo or trademark, the automobile model symbol, logo or trademark, or an automobile dealer's symbol logo or trademark. It may be appreciated by those skilled in the art that because vehicle symbol illumination apparatus 14 is illuminated upon actuation of the brake pedal, no high-mounted stop lamp is required to comply with NHTSA regulations.

Figure 2:
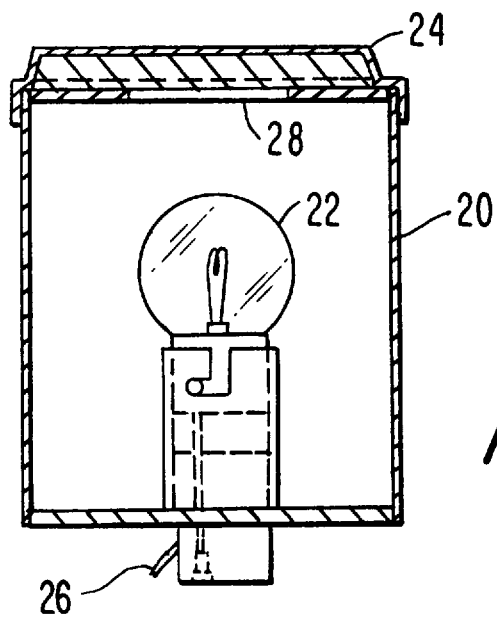
FIG. 2 illustrates a cross-section view of the vehicle symbol illumination apparatus.

FIG. 2 is a side sectional view of the automobile symbol illumination apparatus in accordance with the invention. As preferably embodied, automobile symbol illumination apparatus 14 includes body 20, lamp 22, lens 24 and electrical connections 26. Electrical connection 26 is interconnected with the automotive brake light circuit so that upon actuation of the brakes, symbol or logo 18 of the vehicle symbol illumination apparatus 14 will be illuminated.

Lens 24 interconnects with body 20 to create a light and water tight container for lamp 22. Lens 24 allows light to be transmitted from lamp 22 through apertures 28 in a pattern corresponding to the vehicle symbol to be illuminated. In a preferred embodiment of the invention, the remainder of lens 24 is blocked out so as to prevent the transmission of light. It will be appreciated by this arrangement that the only light transmitted by the automotive symbol illumination apparatus will be in the particular configuration of the desired vehicle symbol. If desired, a symbol display may even be created which is jewel-like and encased in yellow or white metal, which would have a jeweled effect during the day and a bright, glowing or ruby effect at night. Lens 24 may be interchanged on body 20 so that various lenses presenting various symbols may be installed, e.g., by a vehicle symbol illumination apparatus.

Figure 3:
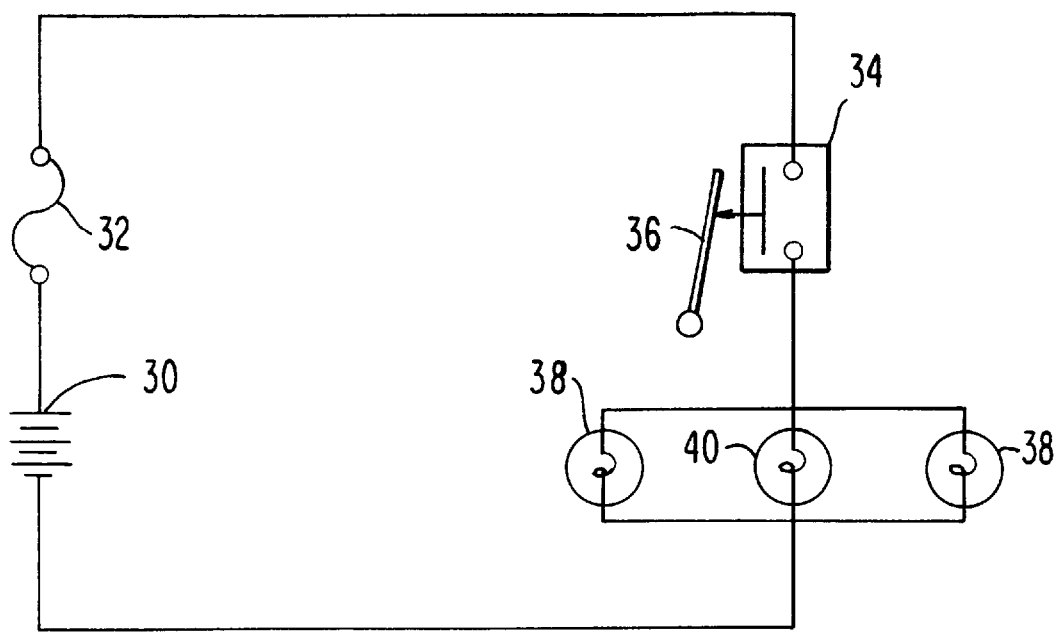
FIG. 3 illustrates a preferred electronic circuit implementing the vehicle symbol illumination apparatus wherein the vehicle symbol is illuminated when the brake is depressed.

FIG. 3 is a schematic diagram of an electrical circuit for the automotive brake light circuit and the vehicle symbol illumination apparatus. In FIG. 3, battery 30 is interconnected through fusible link 32 to switch 34 which is controlled by the actuation of brake pedal 36 for completion of the automotive brake light circuit through brake lamps 38 and vehicle symbol illumination apparatus lamp 40. Upon actuation of brake pedal 36, switch 34 is closed and brake lights 38 are illuminated. In addition, lamp 40 of the automotive symbol illumination apparatus is also illuminated.

In another preferred embodiment, lens 24 will comprise the vehicle symbol or logo and a transparent area around the symbol or logo, preferably a transparent red color. In this embodiment, a light source will illuminate the symbol or logo portion of lens 24 when the parking lights or driving lights are activated and the remainder of the transparent lens 24 will be illuminated when the brake pedal is depressed. Ideally, the illumination of the transparent portion of lens 24 by depressing the brake pedal will obscure or mask the illuminate symbol or logo and give the appearance of a uniform and continuous brake light so that people viewing the illumination of the high mounted brake light are not confused by the lights.

Figure 4:
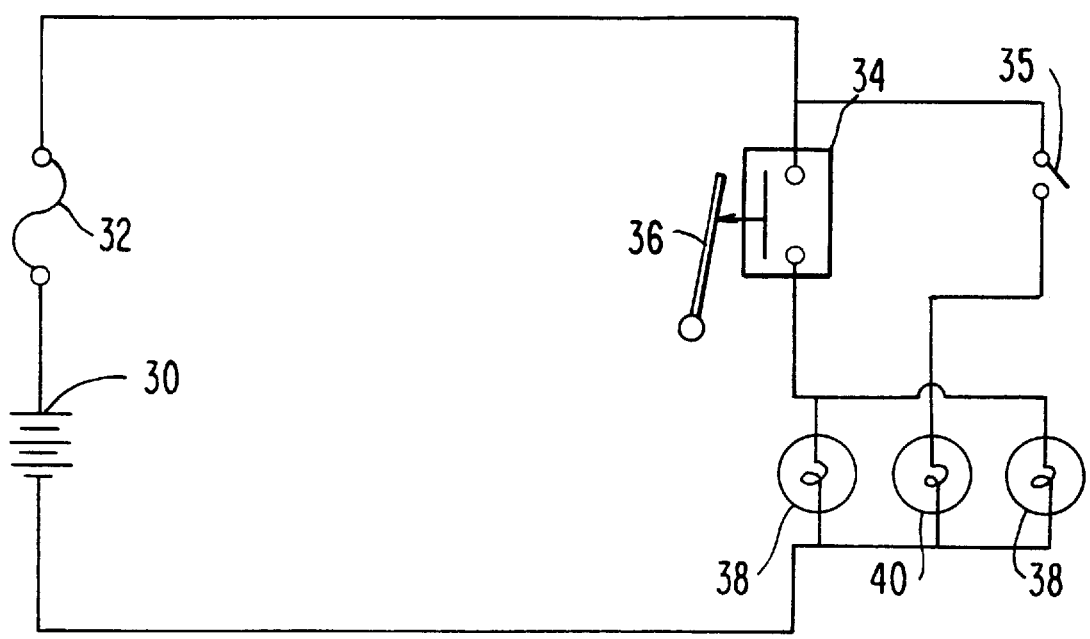
FIG. 4 illustrates a preferred electronic circuit implementing the vehicle symbol illumination apparatus wherein the vehicle symbol is illuminated when the parking and/or driving lights of the vehicle are activated and the mandated high mounted brake light is illuminated when the brake is depressed.

A simplified version of an electronic circuit which can be used to implement this preferred embodiment is shown in FIG. 4. In FIG. 4, battery 30 is interconnected through fusible link 32 to switch 34 which is controlled by the actuation of brake pedal 36 for completion of the automotive brake light circuit through brake lamps 38. Switch 35 is controlled by the operator of the vehicle to activate vehicle symbol illumination apparatus lamp 40 when the parking or driving lights of the vehicle are activated. Upon actuation of brake pedal 36, switch 34 is closed and brake lights 38 are illuminated thereby illuminating the entirety of lens 24. The radiation from lamp 40 can be used to selectively illuminate the symbol or logo 18 by the use of strategically placed reflectors, fiber optics as described in U.S. Pat. No. 4,745, 525, which is incorporated herein by reference, or any other means commonly known in the art.

The electronic circuit shown in FIG. 4 can also be used in the embodiment described above wherein only the logo or symbol portion of the lens 24 transmits light. If the electronic circuit of FIG. 4 is combined with this selectively transmissive type of lens 24, the resulting structure is an illuminated logo or symbol that is illuminated when the brake pedal is depressed. In addition the logo or symbol is illuminated when the parking or driving lights are activated and becomes brighter when the brake pedal is depressed.

Figure 5:
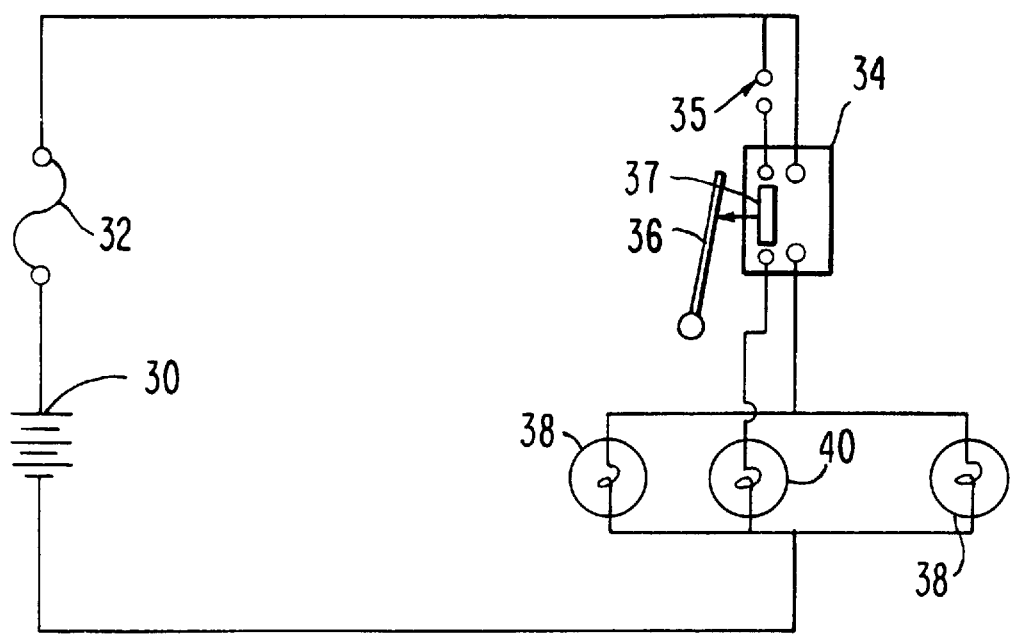
FIG. 5 illustrates a preferred electronic circuit implementing the vehicle symbol illumination apparatus wherein the vehicle symbol is illuminated when the parking and/or driving lights of the vehicle are activated and extinguished when the brake pedal is depressed while the mandated high mounted brake light is illuminated when the brake pedal is depressed and extinguished when the brake pedal is released.

FIG. 5 illustrates a simplified version of an additional preferred embodiment of the electronic circuit which can be use to implement the present invention. In FIG. 5, battery 30 is interconnected through fusible link 32 to switches 34 and 37 which are controlled by the actuation of brake pedal 36. Switch 35 is controlled by the operator of the vehicle to activate vehicle symbol illumination apparatus lamp 40 when the parking or driving lights of the vehicle are activated. Upon actuation or depression of the brake pedal 36, switch 37 is opened causing light 40 to be extinguished and switch 34 is closed causing and brake lights 38 to be illuminated. The depression of brake pedal 36 results in the illumination of the symbol or logo being extinguished and the illumination of the entire lens 24. The radiation from lamp 40 can be used to selectively illuminate the symbol or logo 18 by the use of strategically placed reflectors, fiber optics as described in U.S. Pat. No. 4,745,525, which is incorporated herein by reference, or any other means commonly known in the art.

Figure 6:
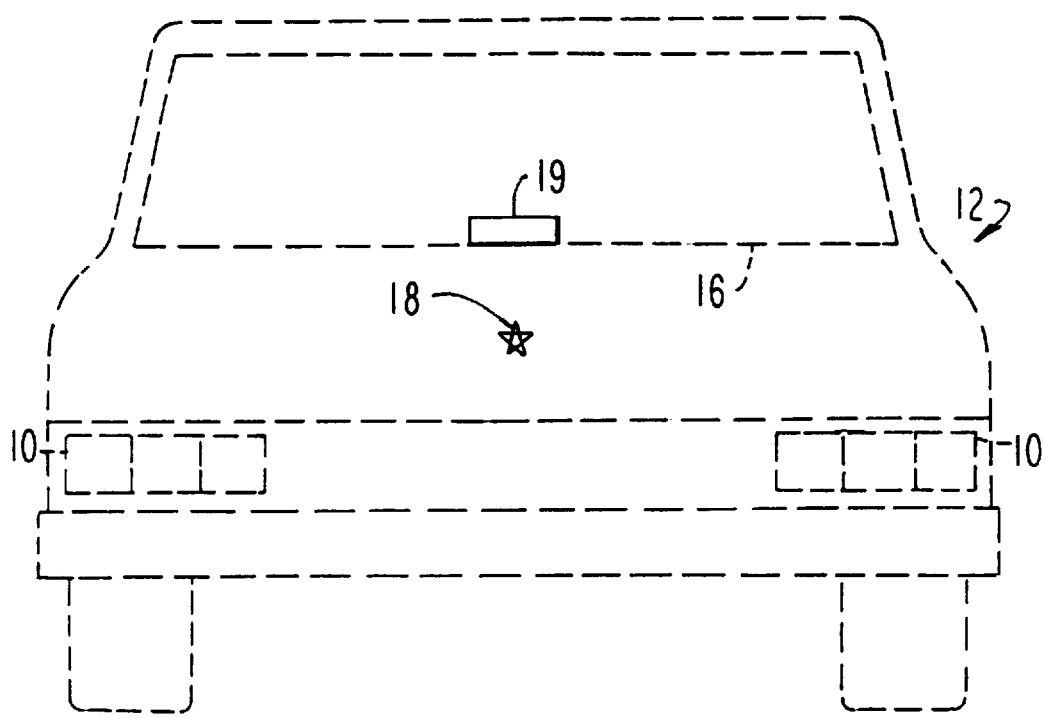
FIG. 6. illustrates an additional embodiment of the vehicle symbol illumination apparatus in accordance with the invention located on the rear portion of an automobile wherein the illuminated logo and mandated high mounted brake light are two separate and distinct structures.

As shown in FIG. 6 the mandated high mounted brake light 19 and the illuminated symbol or logo 18 can be separate and distinct structures. However, the embodiment shown in FIG. 6 preferably employs the electronic circuit of FIG. 5 wherein the illumination of the symbol or logo 18 is extinguished when the mandated high mount brake light is activated by the brake pedal.

It may be appreciated by those skilled in the art that there are numerous advantages associated with the vehicle symbol illumination apparatus according the invention. More particularly, illumination of the vehicle symbol in place of the high-mounted stop lamp avoids obscuring the driver's vision because the apparatus replaces the high-mounted stop lamp located in the rear window. In addition, the extinguishing or masking of the illuminated symbol or logo when the high mounted brake light is activated prevents confusion of other drivers viewing the illuminated symbol or logo and high mounted brake light.

The illumination of the vehicle symbol in accordance with the invention also provides enhanced vehicle marketing value. In this regard, illumination of a symbol identifying the manufacturer or model of a vehicle embodies significant advertising value, especially at night when other forms of manufacturer or model identification are not readily visible. Additionally, symbol illumination on an intermittent basis commands more attention from observers than either a constantly illuminated or constantly non-illuminated vehicle symbol.

With the invention, vehicle manufacturing costs also may be reduced by combining two separate items, the high-mounted stop lamp and the vehicle symbol, both of which typically appear on the rear portion of an automobile.

While the invention has been described in its preferred embodiments, it is to be understood that the words which have been used are words of description, rather than limitation, and that changes may be made within the purview of the appended claims without departing from the true scope and spirit of the invention in its broader aspects.

All the foregoing patents, publications and test methods are hereby incorporated by reference.

What is claimed:

1. A vehicle symbol illumination apparatus operable in conjunction with a vehicle braking and lighting system, comprising;

a high mounted brake light;

an illuminated vehicle symbol comprising a body portion and a lens portion wherein the lens portion comprises a light transmissive portion in the configuration of the symbol associated with the vehicle and a light transmissive portion associated with the high mounted brake light;

a power source; and a switch responsive to operation of the vechicle braking and lighting system for electrically connecting said power source to said illuminated symbol and to said high mounted brake light;

wherein upon activation of the switch, the high mounted brake light is activated and the illuminated symbol is extinguised.

2. A vehicle symbol illumination apparatus in accordance with claim 1, wherein said lens portion may be interchanged with other lens portions on said body portion.

\* \* \* \* \*